United States Patent
Huang et al.

(10) Patent No.: US 6,522,822 B2
(45) Date of Patent: Feb. 18, 2003

(54) STRONGLY CONFINED POLARIZATION-INDEPENDENT SINGLE-MODE OPTICAL RIDGE WAVEGUIDE

(75) Inventors: Wei-Ping Huang, Ancaster (CA); Chenglin Xu, Burlington (CA); Mee Koy Chin, Wilmette, IL (US); Yi Liang, Burlington (CA); Xun Li, Waterloo (CA)

(73) Assignee: LNL Technologies, Inc., Cambridge, MA (US)

( * ) Notice: Subject to any disclaimer, the term of this patent is extended or adjusted under 35 U.S.C. 154(b) by 58 days.

(21) Appl. No.: 09/789,447

(22) Filed: Feb. 20, 2001

(65) Prior Publication Data

US 2001/0024547 A1 Sep. 27, 2001

Related U.S. Application Data

(60) Provisional application No. 60/183,316, filed on Feb. 17, 2000.

(51) Int. Cl.[7] .................................................. G02B 6/10
(52) U.S. Cl. ........................ 385/132; 385/131; 385/129
(58) Field of Search ................................ 385/132, 131, 385/130, 129

(56) References Cited

U.S. PATENT DOCUMENTS 5,703,989 A * 12/1997 Khan et al. ................. 385/130

2002/0048443 A1 * 4/2002 Itoh et al. ................... 385/132

* cited by examiner

Primary Examiner—Rodney Bovernick
Assistant Examiner—Sung Pak
(74) Attorney, Agent, or Firm—Edwards & Angell, LLP

(57) ABSTRACT

A strongly confined ridge waveguide that provides substantially reduced polarization sensitivity, without significant compromise for other waveguide characteristics such as, for example, single-mode condition, and low propagation and bending losses for the fundamental mode. The present invention considers waveguide material composition and thickness for guiding and cladding layers, bend radius, ridge width and etch depth at which the modal indices of the fundamental TE and TM modes are equal. With those parameters, the losses (e.g., the imaginary parts of the modal indices) of the fundamental and first-order modes may be calculated. By considering the previously mentioned criteria, a low-loss, single-mode ridge waveguide may be constructed in accordance with the present invention having losses of the fundamental modes in the range of less than approximately 1.0 dB/mm, and losses of higher-order modes in the range of greater than approximately 10 dB/mm (thus providing a loss difference of at least approximately 10 dB/mm).

19 Claims, 5 Drawing Sheets

STRONGLY CONFINED POLARIZATION-INDEPENDENT SINGLE-MODE OPTICAL RIDGE WAVEGUIDE

CROSS-REFERENCE TO RELATED APPLICATION

This application claims priority to Provisional Patent Application Serial No. 60/183,316, filed on Feb. 17, 2000.

FIELD OF THE INVENTION

The present invention is directed to polarization-independent single-mode ridge waveguides.

BACKGROUND OF THE INVENTION

Optical ridge waveguides are widely used as underlying waveguiding structures in integrated photonic devices and circuits based on semiconductor and other materials due to their ease of fabrication. One of the major shortcomings of the ridge waveguides is polarization sensitivity arising from the geometrical (or form) birefringence of the transverse configuration. A conventional shallow-etched ridge waveguide, such as depicted in FIG. 1 and generally designated as 100, typically includes a substrate 10, a lower cladding layer 20 deposited above the substrate 10, a guiding layer 30 above the lower cladding layer 20, and an upper cladding layer 40 above the guiding layer 30. That waveguide 100 has relatively weak lateral confinement for the optical field, which results in severe leakage loss when a bend is introduced in the waveguide 100.

Deeply etched ridge waveguides, such as depicted in FIG. 2 and generally designated as 100', provide strong lateral confinement and may be bent at small radius without significant leakage loss. An example of such known waveguides can be found in U.S. Pat. No. 5,926,496, which is hereby incorporated by reference in its entirety. Strong lateral confinement permits realization of photonic devices and circuits with much smaller dimensions so that high-performance and low-cost photonic integrated circuits with complex circuitry and a high level of integration may be constructed.

Strongly confined ridge waveguides are, however, highly polarization sensitive. The polarization sensitivity limits applications of the waveguides in fiber-optic communication systems, in which the polarization states of input optical signals to the photonic devices such as switches, add/drop multiplexers, and so on, may change randomly as a function of time and environmental conditions and are not predictable.

Several methodologies have been suggested to reduce and eliminate the polarization sensitivity for guided-wave optical devices in general. Such methods include polarization control, polarization scrambling, polarization diversity, and polarization independent waveguide design. All those methods, except for the polarization independent waveguide design, involve additional components and thus increase the complexity of the devices.

It is thus desirable to provide a ridge waveguide that overcomes the above-described shortcomings of the prior art.

SUMMARY OF THE INVENTION

The present invention is directed to a strongly confined ridge waveguide that provides substantially reduced polarization sensitivity, without significant compromise for other waveguide characteristics such as, for example, single-mode condition, and low propagation and bending losses for the fundamental mode. The present invention considers waveguide material composition and thickness for guiding and cladding layers, bend radius, ridge width and etch depth at which the modal indices of the fundamental TE and TM modes are equal. With those parameters, the losses (e.g., the imaginary parts of the modal indices) of the fundamental and first-order modes may be calculated. By considering the previously mentioned criteria, a low-loss, single-mode ridge waveguide may be constructed in accordance with the present invention having losses of the fundamental modes in the range of less than approximately 1.0 dB/mm, and losses of higher-order modes in the range of greater than approximately 10 dB/mm (thus providing a loss difference of at least approximately 10 dB/mm).

In a first embodiment of the present invention, a polarization-independent single-mode ridge waveguide comprises a lower cladding layer having a thickness, an upper cladding layer having a thickness, and a guiding layer having a thickness and being disposed between the lower and upper cladding layers. A ridge having a ridge width is defined longitudinally along the waveguide by the upper cladding layer and a part of the guiding layer. The ridge width ranges from approximately 1.0 mm to approximately 1.5 mm. An etching depth is defined by the ridge and ranges from approximately 1.7 mm to approximately 2.4 mm. A bend radius is defined along at least a part of a longitudinal length of the waveguide and ranges from approximately 0 mm to approximately 100 mm.

In a second embodiment of the present invention, a polarization-independent single-mode ridge waveguide for guiding an optical signal having a fundamental mode and at least a first higher-order mode comprises a lower cladding layer, an upper cladding layer having a thickness, and a guiding layer having a thickness and disposed between the lower and upper cladding layers. A ridge having a ridge width is defined longitudinally along the waveguide by the upper cladding layer and a part of the guiding layer. An etching depth is defined by said ridge, and a bend radius is defined along at least a part of a longitudinal length of the waveguide. The ridge width, etching depth, said bend radius each have a predetermined value to provide a difference in optical loss for the fundamental mode and for the at least first higher-order mode of at least approximately 10 dB/mm.

By proper choice of the etching depth, the total leakage loss of the higher-order modes may be maximized, while maintaining negligible loss for the fundamental mode. As will be discussed in more detail below, by proper choice of the ridge width and the etching depth for a given bending radius, it is possible to design a polarization-independent single-mode straight or bending waveguide with small leakage loss for the fundamental guided mode.

The invention accordingly comprises the features of construction, combination of elements, and arrangement of parts which will be exemplified in the disclosure herein, and the scope of the invention will be indicated in the claims.

BRIEF DESCRIPTION OF THE DRAWINGS

In the drawing figures, which are not to scale, and which are merely illustrative, and wherein like reference characters denote similar elements throughout the several views.

DETAILED DESCRIPTION OF THE PRESENTLY PREFERRED EMBODIMENTS

The present invention is directed to a strongly confined ridge waveguide that provides substantially reduced polarization sensitivity, without significant compromise for other waveguide characteristics such as, for example, single-mode condition, and low propagation and bending losses for the fundamental mode. The present invention considers waveguide material composition and thickness for guiding and cladding layers, bend radius, ridge width and etch depth at which the modal indices of the fundamental TE and TM modes are equal. With those parameters, the losses (e.g., the imaginary parts of the modal indices) of the fundamental and first-order modes may be calculated. By considering the previously mentioned criteria, a low-loss, single-mode ridge waveguide may be constructed in accordance with the present invention having losses of the fundamental modes in the range of less than approximately 1.0 dB/mm, and losses of higher-order modes in the range of greater than approximately 10 dB/mm (thus providing a loss difference of at least approximately 10 dB/mm and minimizing the losses for the fundamental mode signals, while maximizing the losses for the higher-order mode signals).

Figure 1:
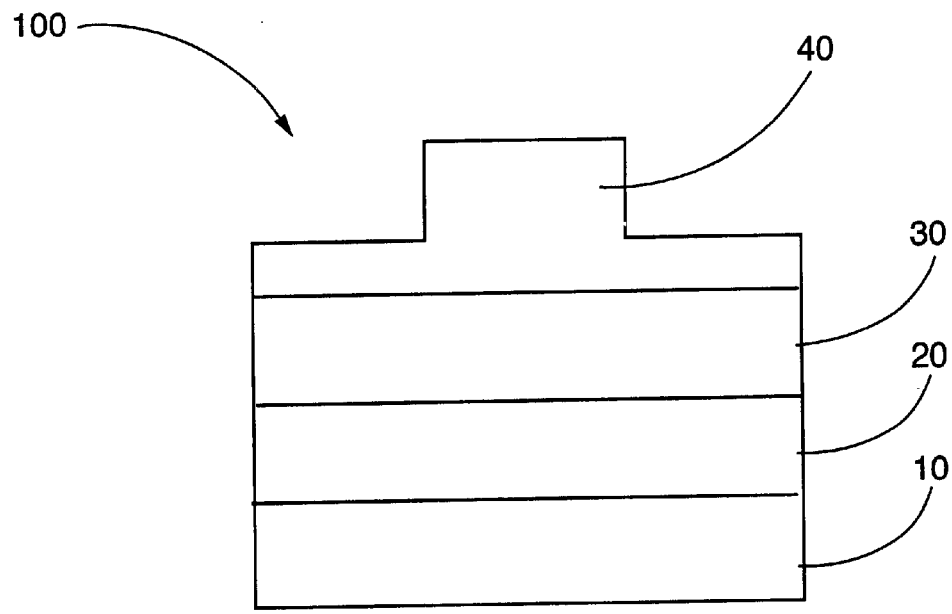
FIG. 1 is a diagrammatic sectional view of a prior art shallow-etched ridge waveguide.
Figure 2:
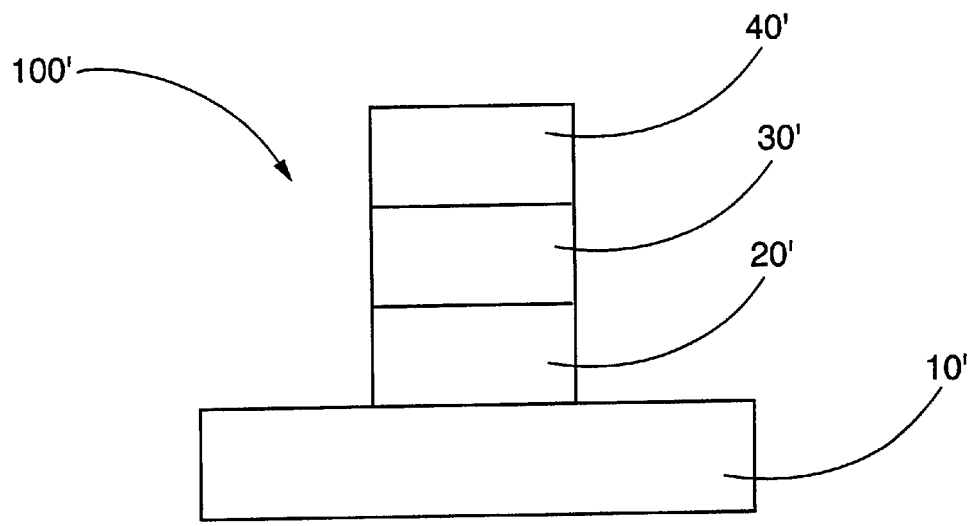
FIG. 2 is a diagrammatic sectional view of a prior art deeply-etched ridge waveguide.
Figure 3:
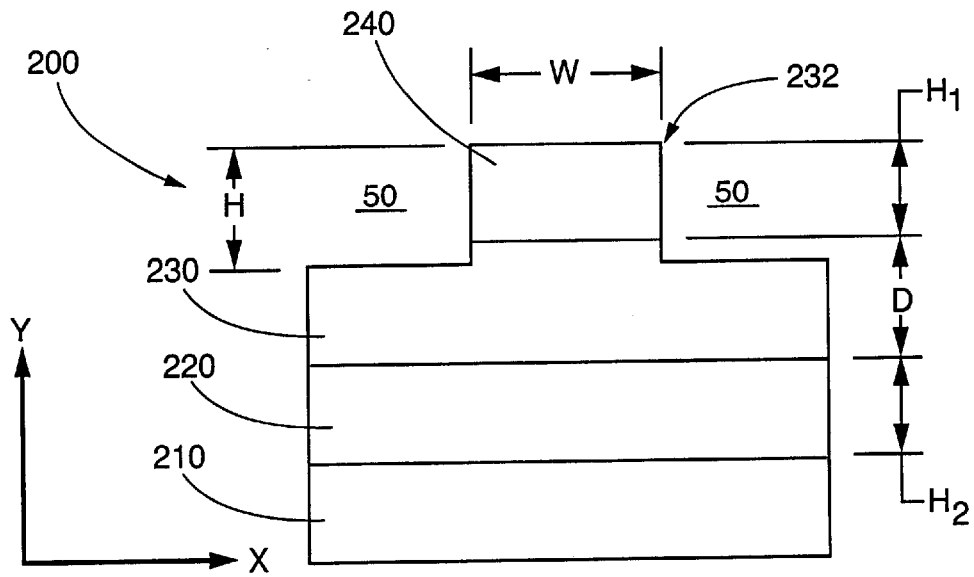
FIG. 3 is a diagrammatic sectional view of a ridge waveguide constructed in accordance with an embodiment of the present invention.

Referring now to the drawings in detail, FIG. 3 depicts a polarization-independent single-mode ridge waveguide constructed in accordance with an embodiment of the present invention and generally depicted as 200. The waveguide 200 may be fabricated from a variety of material systems such as InP, GaAs and Si substrates. The waveguide 200 is constructed of a substrate 210, upon which is deposited on a lower cladding layer 220 (using known or hereafter developed semiconductor deposition, forming, etching, etc., techniques). A guiding layer 230 is deposited on the lower cladding layer 220 and an upper cladding layer 240 is deposited on the guiding layer 230. The upper cladding layer 240 and at least a part of the guiding layer 230 may be selectively etched to a predetermined width, w, that defines a ridge 232 of the waveguide 200.

Typically, the refractive index of the medium 50 (e.g., air) surrounding the ridge 232 is much lower than the refractive indices of the guiding layer 230 and cladding layers 220 and 240. This results in a large refractive index contrast along the lateral direction (i.e., along the x direction in FIG. 3) that provides strong optical confinement in that direction. Due to the structural asymmetry of the transverse configuration (i.e., the y direction in FIG. 3) the propagation constants ($\beta$) of the fundamental quasi-TE (transverse electric) mode ($\beta_x$) and quasi-TM (transverse magnetic) mode ($\beta_y$) are generally not equal. As the refractive index difference between the guiding layer 230 and the cladding layers 220, 240 along the y direction is much smaller than that along the x direction, the (real part) of the propagation constant of the TE mode (with dominant electrical field along x direction) will be lower than that of the TM mode (with dominant electrical field along y direction) as long as the width, w, of the ridge 232, is sufficiently small. On the other hand, for a sufficiently large ridge width, the waveguide 200 approaches the configuration of a slab so that the propagation constant of the TE mode is greater than that of the TM mode. Thus, at a certain ridge width or widths, the propagation constants of the TE and the TM modes will be equal, therefore leading to a polarization independent waveguide in the absence of modal losses.

Furthermore, the width of ridge 232 at which the propagation constants of the TE and TM modes are equal will likely depend on the bending radius of the waveguide 200 at that location. As the bending radius increases, the optical field shifts to the left and hence a larger ridge width may be required to balance the form birefringence of the fundamental guided modes.

Figure 9:
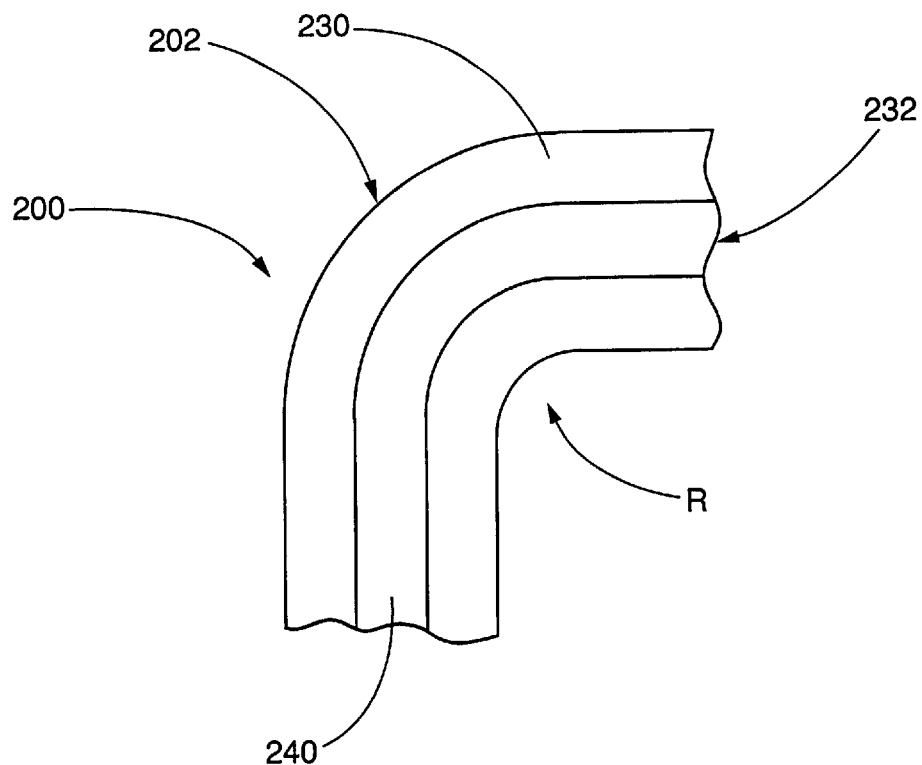
FIG. 9 is a top view of a waveguide constructed in accordance with an embodiment of the present invention and having a curved or arcuate section having a predetermined bend radius.

As depicted in FIG. 9, a waveguide 200 constructed in accordance with an embodiment of the present invention may include a curved or arcuate section 202 having a bending radius, R, ranging from approximately ∞ µm to approximately 100 µm. That is, the present invention is directed to a substantially straight waveguide 200 (bend radius approximately equal to ∞ µm) and to a waveguide 200 having a curved or arcuate section 202 (bend radius ranging from approximately 20 µm to 100 µm). While FIG. 9 depicts a waveguide 200 having a single curved or arcuate section 202 having a predetermined bend radius, the present invention is not so limited. A waveguide 200 constructed in accordance with the present invention may have any number of curved or arcuate sections 202, provided that each such section 202 satisfies the relationship between bend radius, etching depth, and ridge width so as to provide a polarization-independent single-mode ridge waveguide with strong lateral confinement.

The following detailed description and discussion is directed to a polarization-independent single-mode ridge waveguide with strong lateral confinement and constructed in accordance with an embodiment of the present invention. The specific numerical values provide various illustrative embodiments of the present invention. It should be noted that other numerical values and embodiments are also contemplated by, and within the scope and spirit of the present invention, and that the specific values discussed herein are provided as illustrative, non-limiting examples of the present invention.

One desired waveguide characteristic with regard to polarization independence is that the propagation constants of the quasi-TE and TM fundamental modes are equal, i.e., $\beta_x = \beta_y$. It is also desired that the attenuation ($\alpha$) by the waveguide 200 of the fundamental quasi-TE ($\alpha_{x0}$) and quasi-TM modes ($\alpha_{y0}$) are smaller than approximately 1.0 dB/mm. In addition, it is desirable that the attenuation ($\alpha$) of the higher-order modes ($\alpha_{x1}$, and $\alpha_{y1}$) are greater than approximately 10 dB/mm.

In one embodiment of the present invention, the guiding layer 230 is constructed of InGaAsP and has a refractive index of approximately 3.4, which is typical of InGaAsP at a wavelength approximately equal to 1.55 µm. The lower and upper cladding layers 220, 240 are each constructed of InP, and each have a refractive index of approximately 3.2 at a wavelength approximately equal to 1.55 µm. The thickness, $H_1$, of the upper cladding layer 240 is approximately equal to 1.4 µm. The thickness, D, of the guiding layer 230 is approximately equal to 0.5 µm, and the thickness, $H_2$, of the lower cladding layer 220 is approximately equal to 0.5 µm. The total etching depth, H, of the ridge 232 may be either $H_1$ + etching depth in the guiding layer 230, or $H_1+D+H_2$ (etching depth in lower cladding layer 220), as depicted in FIG. 3.

Figure 4:
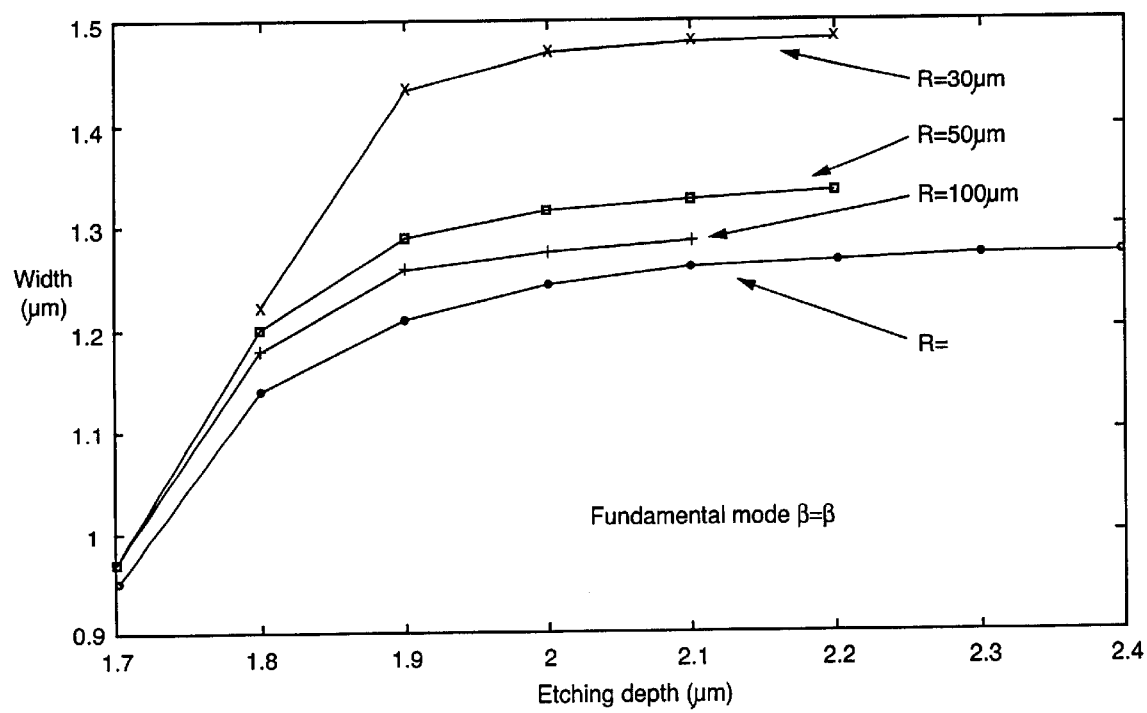
FIG. 4 is a graph depicting the relationship between etching depth and waveguide width for a polarization independent ridge waveguide having different bend radii.

Computer simulation was conducted to determine the relationship between ridge width, w, and etching depth for various bend radii of a waveguide 200 constructed in accordance with the present invention. The propagation constant of the quasi-TE and quasi-TM fundamental modes were set equal to each other (i.e., $\beta_x=\beta_y$). For a bend radius of approximately 30 µm, 50 µm, and 100 µm, and for a straight waveguide, the etching depth, H, and ridge width, w, are depicted in FIG. 4. The etching depth, H, starts at approximately 1.7 µm because the bending induced loss for fundamental mode is too high and no polarization independent structure for straight waveguide can be found if the etching depth is too shallow (e.g., <1.7 µm).

Figure 5:
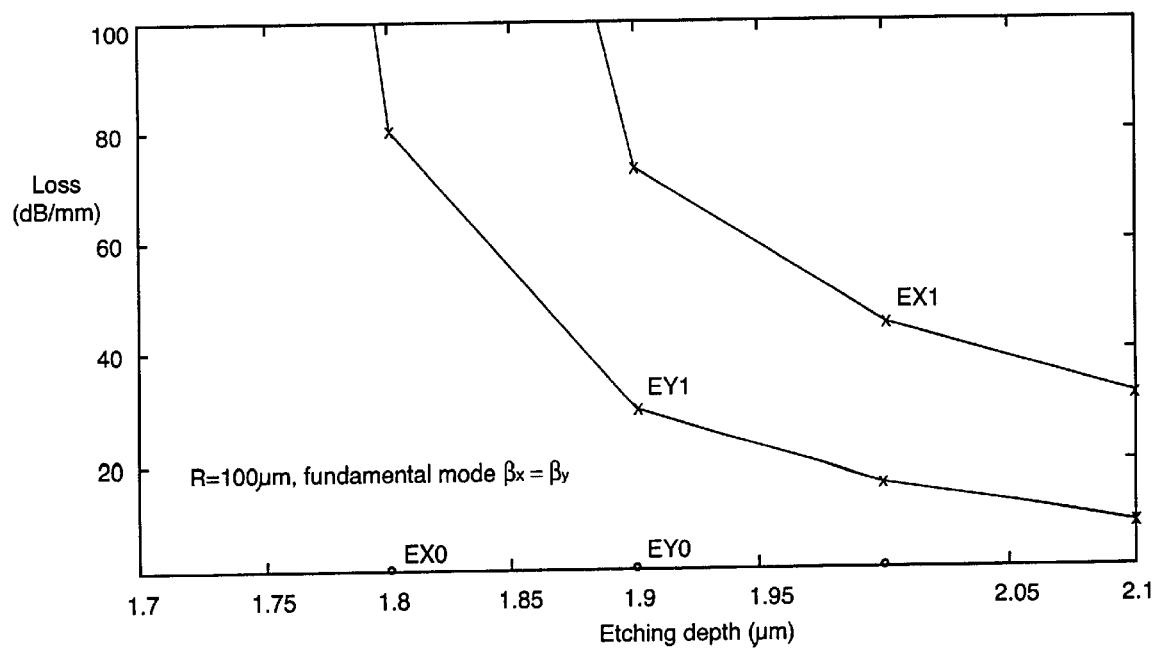
FIG. 5 is a graph depicting the relationship between etching depth and loss for the fundamental and higher-order modes of a polarization independent ridge waveguide having a bend radius of approximately 100 µm.
Figure 6:
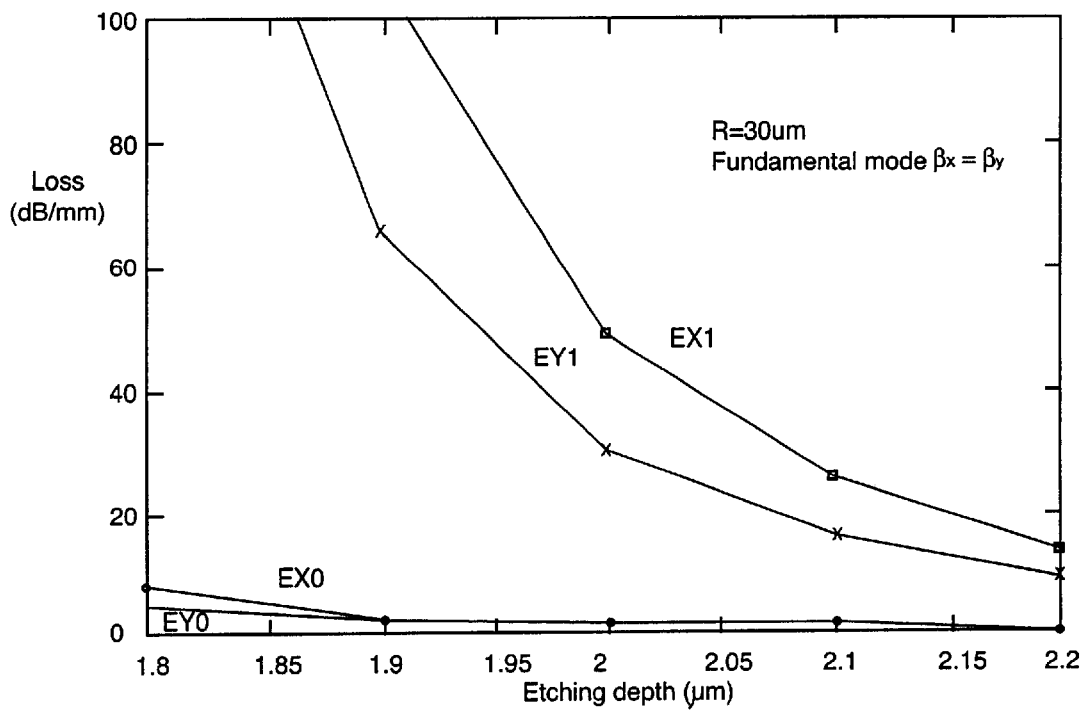
FIG. 6 is a graph depicting the relationship between etching depth and loss for the fundamental and higher-order modes of a polarization independent ridge waveguide having a bend radius of approximately 30 µm.
Figure 7:
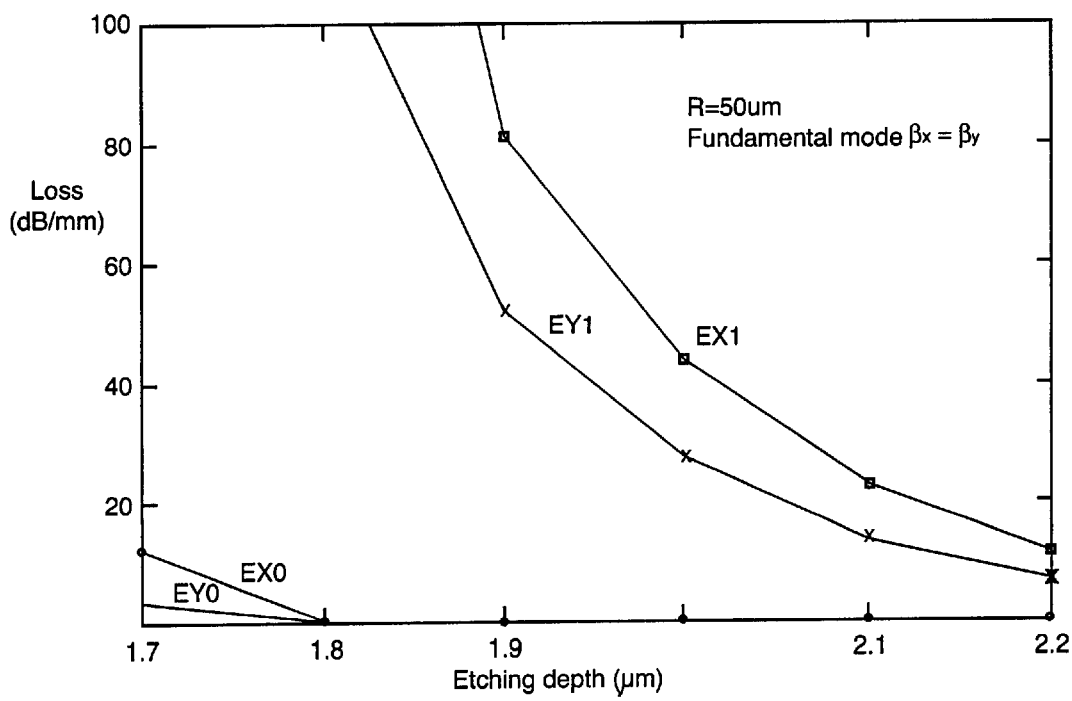
FIG. 7 is a graph depicting the relationship between etching depth and loss for the fundamental and higher-order modes of a polarization independent ridge waveguide having a bend radius of approximately 50 µm.

The bending losses of the first four (4) modes ($E_{x0}$, $E_{y0}$, $E_{x1}$, $E_{y1}$) versus etching depth at bending radius of 100 µm, 30 µm, and 50 µm are depicted in FIGS. 5, 6, and 7, respectively. The waveguide structures simulated are all in accordance with the embodiment of FIG. 3, as discussed above, so as to maintain the polarization independence. It is clear in FIG. 5 that for a bend radius of 100 µm, the loss difference between fundamental modes ($E_{x0}$ and $E_{y0}$) and first higher-order mode ($E_1$ and $E_{y1}$) can exceed 10 dB/mm at an etching depth below 2.0 µm. A loss difference exceeding 10 dB/mm may also be achieved for a bend radius of 50 µm and an etching depth ranging from approximately 1.8 µm and 2.1 µm, as depicted in FIG. 7. For a bend radius of 30 µm, an etching depth ranging from approximately 2.0 µm to 2.1 µm will provide the desired 10 dB/mm difference between the fundamental mode loss and first-order mode loss, as depicted in FIG. 6. For a bend radius smaller than approximately 20 µm, both fundamental and first-higher order modes experience high loss at all etching depths. It is thus not possible to provide the desired loss difference in a polarization-independent single-mode ridge waveguide with strong lateral confinement.

Figure 8:
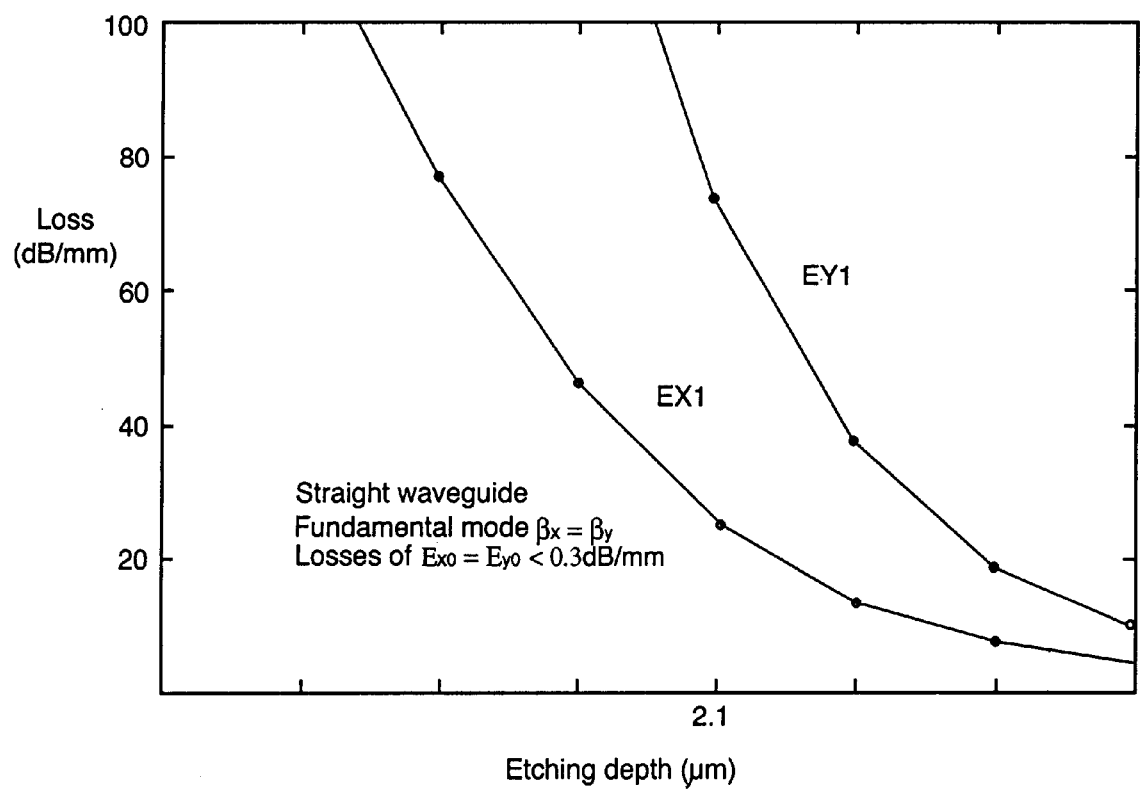
FIG. 8 is a graph depicting the relationship between etching depth and loss for the fundamental and higher-order modes of a substantially straight polarization independent ridge waveguide.

For a straight waveguide 200, polarization-independent single-mode operation is possible when the etching depth is below approximately 2.1 µm, as depicted in FIG. 8. The losses of first higher-order modes $E_{x1}$ and $E_{y1}$ are higher than those of a waveguide with a bend radius of approximately 100 µm. The reason is that the ridge width, w, has to be smaller for straight waveguide to have $\beta_x=\beta_y$ for fundamental modes $E_{x0}$ and $E_{y0}$.

In accordance with an embodiment of the present invention, a polarization-independent single-mode ridge waveguide 200 with strong lateral confinement may be constructed by calculating the ridge widths and the corresponding etching depths at which the real parts of the modal indices of the fundamental TE and TM modes are equal for certain waveguide material compositions and thickness of the guiding layer 230 and lower and upper cladding layers 220 and 240, and a certain bending radius (including no bend radius). The various parameters, e.g., ridge width, etching depth, and bend radius may be configured as desired, provided that the relationship between those various parameters discussed in detail herein and depicted in the figures is maintained.

For a predetermined bend radius and with the constraint of the ridge width and etching depth, the losses (imaginary parts of the modal indices) of the fundamental and the first higher-order modes may be calculated (see, e.g., FIGS. 4–8).

A low-loss polarization-independent single-mode ridge waveguide 200 with strong lateral confinement may be constructed by limiting the losses of the fundamental modes to smaller than approximately 1.0 dB/mm), and by setting the losses of the higher-order modes to greater than approximately 10 dB/mm).

Thus, while there have been shown and described and pointed out novel features of the present invention as applied to preferred embodiments thereof, it will be understood that various omissions and substitutions and changes in the form and details of the disclosed invention may be made by those skilled in the art without departing from the spirit of the invention. It is the intention, therefore, to be limited only as indicated by the scope of the claims appended hereto.

It is also to be understood that the following claims are intended to cover all of the generic and specific features of the invention herein described and all statements of the scope of the invention which, as a matter of language, might be said to fall therebetween.

What is claimed is:

1. A polarization-independent single-mode ridge waveguide comprising:

a lower cladding layer having a thickness;

an upper cladding layer having a thickness; and a guiding layer having a thickness and being disposed between said lower cladding layer and said upper cladding layer;

a ridge having a ridge width being defined longitudinally along said waveguide by said upper cladding layer and a part of said guiding layer, said ridge width ranging from approximately 1.0 µm to approximately 1.5 µm;

an etching depth being defined by said ridge, said etching depth ranging from approximately 1.7 µm to approximately 2.4 µm;

a bend radius being defined along at least a part of a longitudinal length of said waveguide, said bend radius ranging from approximately 0 µm to approximately 100 µm.

2. A polarization-independent single-mode ridge waveguide as recited by claim 1, wherein said bend radius is approximately equal to 0 µm, and wherein said etching depth is less than approximately 2.1 µm.

3. A polarization-independent single-mode ridge waveguide as recited by claim 1, wherein said bend radius is approximately equal to 30 µm, and wherein said etching depth ranges from approximately 2.0 µm to approximately 2.1 µm.

4. A polarization-independent single-mode ridge waveguide as recited by claim 1, wherein said bend radius is approximately equal to 50 µm, and wherein said etching depth ranges from approximately 1.8 µm to approximately 2.1 µm.

5. A polarization-independent single-mode ridge waveguide as recited by claim 1, wherein said bend radius is approximately equal to 100 µm, and wherein said etching depth is less than approximately 2.0 µm.

6. A polarization-independent single-mode ridge waveguide as recited by claim 1, wherein said guiding layer is constructed of InGaAsP.

7. A polarization-independent single-mode ridge waveguide as recited by claim 6, wherein said guiding layer has a thickness of approximately 0.5 μm.

8. A polarization-independent single-mode ridge waveguide as recited by claim 6, wherein said upper cladding layer and said lower cladding layer are constructed of InP.

9. A polarization-independent single-mode ridge waveguide as recited by claim 8, wherein said upper cladding layer has a thickness of approximately 1.4 μm, and wherein said lower cladding layer has a thickness of approximately 0.5 μm.

10. A polarization-independent single-mode ridge waveguide for guiding an optical signal having a fundamental mode and at least a first higher-order mode, said waveguide comprising:

a lower cladding layer;

an upper cladding layer having a thickness; and a guiding layer having a thickness and being disposed between said lower cladding layer and said upper cladding layer;

a ridge having a ridge width being defined longitudinally along said waveguide by said upper cladding layer and a part of said guiding layer;

an etching depth being defined by said ridge;

a bend radius being defined along at least a part of a longitudinal length of said waveguide;

said ridge width, said etching depth, and said bend radius each having a predetermined value producing a difference in optical loss for the fundamental mode and for the at least first higher-order mode of at least approximately 10 dB/mm.

11. A polarization-independent single-mode ridge waveguide as recited by claim 10, wherein said bend radius ranging from approximately 0 μm to approximately 100 μm, said ridge width ranging from approximately 1.0 μm to approximately 1.5 μm, and said etching depth ranging from approximately 1.7 μm to approximately 2.4 μm.

12. A polarization-independent single-mode ridge waveguide as recited by claim 11, wherein said bend radius is approximately equal to 0 μm, and wherein said etching depth is less than approximately 2.1 μm.

13. A polarization-independent single-mode ridge waveguide as recited by claim 11, wherein said bend radius is approximately equal to 30 μm, and wherein said etching depth ranges from approximately 2.0 μm to approximately 2.1 μm.

14. A polarization-independent single-mode ridge waveguide as recited by claim 11, wherein said bend radius is approximately equal to 50 μm, and wherein said etching depth ranges from approximately 1.8 μm to approximately 2.1 μm.

15. A polarization-independent single-mode ridge waveguide as recited by claim 11, wherein said bend radius is approximately equal to 100 μm, and wherein said etching depth is less than approximately 2.0 μm.

16. A polarization-independent single-mode ridge waveguide as recited by claim 10, wherein said guiding layer is constructed of InGaAsP.

17. A polarization-independent single-mode ridge waveguide as recited by claim 16, wherein said guiding layer has a thickness of approximately 0.5 μm.

18. A polarization-independent single-mode ridge waveguide as recited by claim 16, wherein said upper cladding layer and said lower cladding layer are constructed of InP.

19. A polarization-independent single-mode ridge waveguide as recited by claim 18, wherein said upper cladding layer has a thickness of approximately 1.4 μm, and wherein said lower cladding layer has a thickness of approximately 0.5 μm.

* * * * *